United States Patent [19]

Carli

[11] Patent Number: 4,661,085

[45] Date of Patent: Apr. 28, 1987

[54] LOST MOTION CLUTCH ASSEMBLY

[75] Inventor: Alvin J. Carli, Sebring, Ohio

[73] Assignee: Philips Home Products, Inc., Akron, Ohio

[21] Appl. No.: 773,645

[22] Filed: Sep. 9, 1985

[51] Int. Cl.$^4$ ............................................. F16D 3/10
[52] U.S. Cl. ...................................... 464/160; 310/78
[58] Field of Search ................. 192/56 R; 310/78, 92, 310/100; 464/35, 36, 30, 46, 47, 139, 160, 161, 142

[56] References Cited

U.S. PATENT DOCUMENTS

| | | | |
|---|---|---|---|
| 1,669,507 | 5/1928 | Dickson | 310/78 |
| 1,809,512 | 6/1931 | Defays et al. | 310/78 |
| 2,640,338 | 6/1953 | Charvat | 464/160 X |
| 2,983,121 | 5/1961 | Naas | 464/36 |
| 3,117,432 | 1/1964 | Schleicher | 464/139 |
| 3,487,902 | 1/1970 | Persson et al. | 192/56 R |
| 3,819,966 | 6/1974 | Noguchi | 310/78 X |

FOREIGN PATENT DOCUMENTS 1134678  4/1957  France ................................ 464/36

Primary Examiner—Daniel P. Stodola
Attorney, Agent, or Firm—Pearne, Gordon, McCoy & Granger

[57] ABSTRACT

A lost motion clutch assembly is disclosed which has first, second, and third clutch members. The first and third clutch members are mounted coaxially and contain a plurality of recesses in the surfaces facing each other. The second clutch member is disposed between the first and third, and preferably includes a plurality of balls disposed in arcuate recesses in the first and third clutch members. Each recess has two terminating ends forming engagement shoulders to engage a portion of the balls at the termination of each of the two directions of rotation. Upon inital rotation of the first clutch member in a first rotational direction, the third clutch member is not rotated until a ball has come into contact with the opposite end of the recess in the first clutch member 31 and also in engagement with the opposite end of a recess in the third clutch member. By this construction, an additional angle of angular lost motion is achieved for a given number of balls. Only 80 degrees of motion is achieved on the balls relative to one clutch member, but an additional 80 degrees is achieved between the balls and the other clutch member, for a total of about 160 degrees of lost motion, yet three balls are utilized for symmetry and for carrying the load.

12 Claims, 2 Drawing Figures

LOST MOTION CLUTCH ASSEMBLY

BACKGROUND OF THE INVENTION

This invention is directed to a lost motion clutch assembly which is a type of a positive clutch. A typical lost motion clutch has two parts, the first part being permitted to have a certain angular motion before it engages a portion of the second clutch part to cause it to start rotating. A difficulty with this type of lost motion clutch is that it has only a very limited angular amount of lost motion, e.g., about 90 degrees is a typical lost motion amount. Where a load is to be accelerated from rest, and the load has a high starting torque requirement, this is often extremely difficult to accomplish with a single-phase electric motor, which usually has a lower starting torque than running torque. Many electric motors have a third harmonic dip in the speed-torque curve and are suitable only for driving loads with low starting torque requirements. Even capacitor induction motors, whether of the capacitor-start or capacitor-run type, have a starting torque which is lower than the running or pull-out torque.

The problem to be solved, therefore, is how to construct a lost motion clutch with a sufficiently large angular amount of lost motion so that the motor driving the load through the lost motion clutch can accelerate to a point of near maximum torque to be able to start a load requiring high starting torque.

This problem is solved by a lost motion clutch assembly comprising, in combination, first, second, and third clutch members, means mounting said first and third clutch members coaxially on a shaft axis for limited relative rotation therebetween, means mounting said second clutch member between said first and third clutch members for movement in a plane normal to said axis, each said clutch member having at least a first engagement shoulder and said second member also having a second engagement shoulder, all said engagement shoulders being disposed at substantially equal radii, said first engagement shoulders of said first and second clutch members being disposed in a common plane of rotation and said second engagement shoulder of said second clutch members being disposed in the plane of rotation of said first engagement shoulder of said third clutch member, whereby upon initial rotation of said first clutch member in a first direction said lost motion clutch assembly has a predetermined angular lost motion before the third clutch member is rotated by engagement of said first and second engagement shoulders of said second clutch member with said first shoulders on said first and third clutch members.

Accordingly, an object of the invention is to provide a lost motion clutch assembly with an arcuate lost motion exceeding 90 degrees.

Another object of the invention is to provide a lost motion clutch assembly which includes three parts, with a lost motion between the first and second parts and another lost motion between the second and third parts.

A further object of the invention is to provide a lost motion cluch assembly which also functions as a thrust bearing during the lost motion action.

Still another object of the invention is to provide a lost motion clutch assembly which incorporates planetary action of balls during the angular lost motion.

Other objects and a fuller understanding of the invention may be had by referring to the following description and claims, taken in conjunction with the accompanying drawing.

DESCRIPTION OF THE PREFERRED EMBODIMENT

Figure 1:
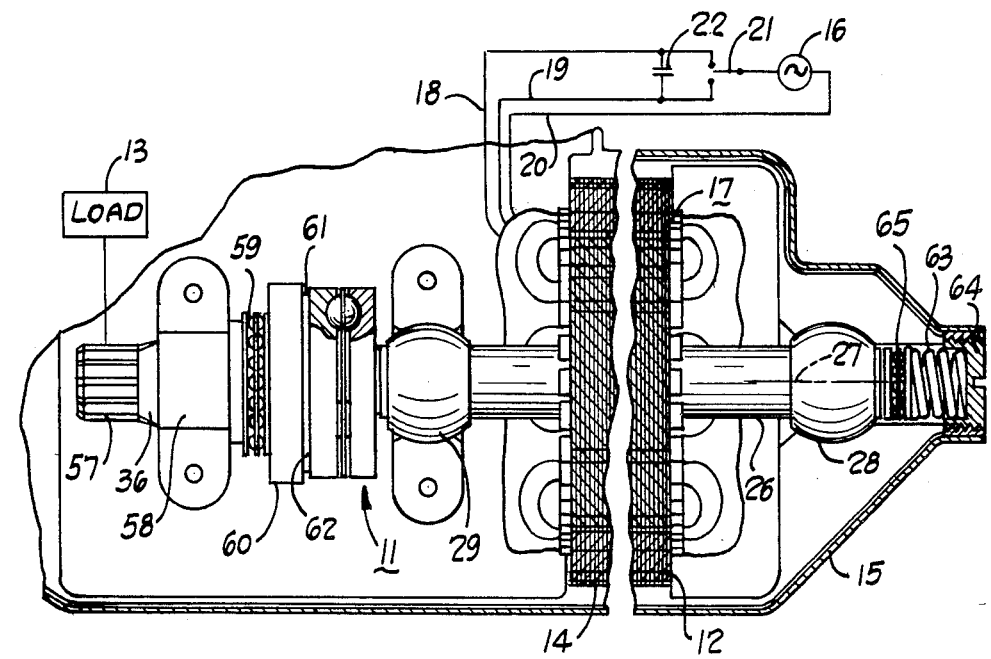
FIG. 1 is a longitudinal, sectional view of a motor connected to drive a load through a lost motion clutch assembly of the invention.
Figure 2:
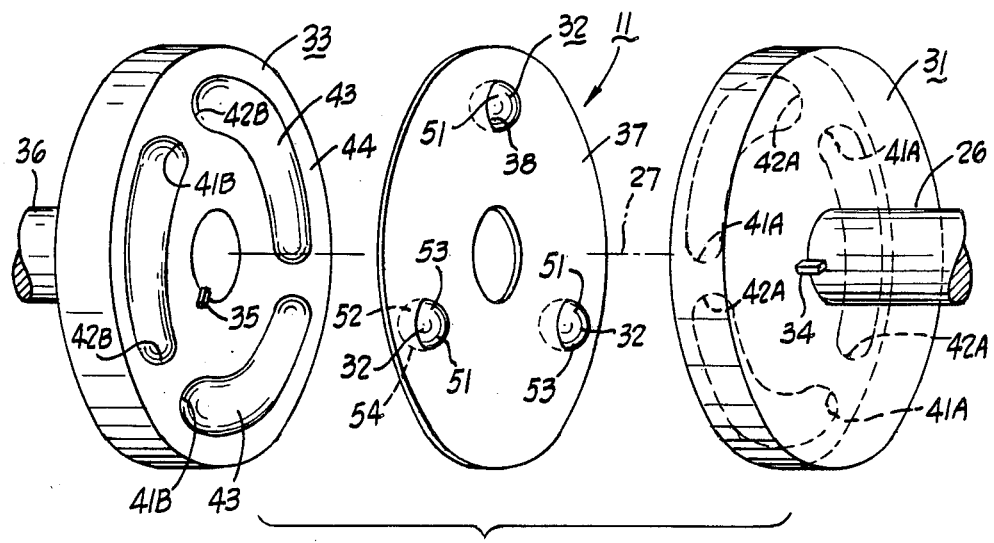
FIG. 2 is an exploded, enlarged isometric view of the lost motion clutch assembly of the invention.

FIG. 2 illustrates an exploded view of the lost motion clutch assembly 11, and FIG. 1 illustrates this clutch assembly 11 in an environment with an electric motor 12 driving a load 13 through this clutch. The motor 12 has a rotor 17 and a stator 14 mounted in a housing 15 which houses the parts of this assembly. The motor 14 is shown as a squirrel cage motor energizable from a single-phase A.C. source 16. The motor 12 is typically a one-fourth to one-half horsepower, and has two equal field windings with leads 18 and 19 and a common lead 20 connected to the A.C. source 16 through a reversing switch 21. A capacitor 22 is connected across the leads 18 and 19 so that the motor becomes a capacitor-run induction motor with equal torque in the two directions of rotation.

The motor 12 has the rotor 17 fixed on a shaft 26 and rotatable about an axis 27 by being journaled in the housing 15 by bearings 28 and 29.

The lost motion clutch assembly 11 is located at the left end of the shaft 26, and includes first, second, and third clutch members 31, 32, and 33, respectively. These are better shown in FIG. 2. The first clutch member 31 is fixed to the motor shaft 26, such as by the key 34. The third clutch member 33 is preferably identical to the first clutch member 31, and is keyed at 35 to an output shaft 36. The second clutch member 32 is disposed between the first and third clutch members, and in this preferred embodiment includes a rollable element shown as a ball. In fact, in the preferred embodiment, there are three such balls or clutch members 32, which may be disposed in a cage 37. This may be a thin, low friction disk, for example, made of nylon, with apertures 38 to closely receive the balls 32 and space them equiangularly 120 degrees and near the periphery of this cage 37.

The first clutch member 31 has first and second engagement shoulders 41A and 42A, respectively, and the third clutch member 33 has the same engagement shoulders but labeled 41B and 42B for convenience in referring to them. These engagement shoulders are at the termination of arcuate recesses in this particular embodiment. Since there are a plurality of balls 32, there are an equal number of plurality of recesses 43. These are arcuate recesses near the periphery of the clutch members 31 and 33, and in cross section each recess is designed to be complementary to substantially one-half the rollable element or ball 32, and hence these recesses are substantially semicircular in cross section. Also, the engagement shoulders 41A, for example, are designed to be complementary to the balls 32, and hence are semicircular in a plan view of the front face 44 of the respective clutch member 31 or 33. The recesses 43 are arcuate about the shaft axis 27, and disposed at the same radii as the balls 32 in the cage 37.

The balls 32 are adapted to roll in the recesses 43 and to engage the engagement shoulders 41 and 42 when the input or first clutch member 31 is rotated in opposite rotational directions. When the respective ball 32 is rolled along the recess 43 into engagement with an engagement shoulder 41 or 42, then the ball 32 may be considered as having first, second, third, and fourth engagement shoulders 51–54, respectively, since these clutch members 32 are rollable elements, namely balls, and these engagement shoulders are different portions on the surface of each respective ball.

The exploded isometric view of FIG. 2 shows the lost motion clutch assembly 11 in one limit position. If now the first clutch member 31 is initially rotated in a clockwise direction, the balls 32 will roll in their respective recesses 43 as a type of planetary movement, with the cage 37 rotating at one-half the speed of the rotation of the first clutch member 31. During this initial third clutch member 33 because the angular lost motion has not been taken up. The angle between the two limit positions of a ball in a particular recess 43 may be about 80 degrees in this preferred embodiment, and hence the total angular lost motion of the clutch assembly 11 is approximately 160 degrees. Therefore, when the first clutch member 31 has rotated through an angle of about 160 degrees, the cage 37 will have rotated about 80 degrees, and then the first engagement shoulders 41A on the first clutch member will engage the first engagement shoulders 51 on the balls 32, and at substantially the same time, the second engagement shoulders 52 on the balls 32 will engage the first engagement shoulders 41B on the third clutch member 33. It is only upon the completion of this 160-degree lost motion that torque will begin to be applied to the third clutch member 33 to rotate the load 13. When the motor 12 is de-energized and rotation stopped, the motor 12 may be reversed in rotational direction by the switch 21. The initial counterclockwise rotation of the first clutch member 31 will not cause any rotation of the third clutch member 33; instead, this first clutch member 31 will rotate about 160 degrees counterclockwise while the cage 37 is rotating about 80 degrees counterclockwise. The angular lost motion is taken up when the second engagement shoulder 42A on the first clutch member 31 engages the third engagement shoulder 53 on the respective ball 32. At substantially the same time, the fourth engagement shoulder 54 on the ball 32 will engage the second engagement shoulder 42B on the third clutch member, and hence counterclockwise rotation will be imparted to this third clutch member 33. This will be with the parts in the relative positions shown in FIG. 2.

The lost motion clutch 11 is shown in FIG. 1 as part of a motor assembly. The output shaft 36 is journaled in a bearing 58, which is a radial and flange bearing and a thrust bearing 59 is disposed between the flange of the bearing 58 and a friction clutch plate 60 which carries a clutch lining 61 engaging the rear face 62 of the third clutch member 33. The output shaft 36 drives the load 13 in some manner, for example, by the pinion 57. The friction clutch 60–62 is urged into engagement by a compression spring 63 adjustably held by an adjusting screw 64 and acting through a thrust bearing 65 on the right end of the motor shaft 26. By this means, the friction clutch 60–62 may slip upon a predetermined overload. Also, in this environment it will be noted that the lost motion clutch assembly 11 acts not only in its lost motion capacity during initial rotation of the motor, but also acts as a thrust bearing to transmit the force of the compression spring 63 to the friction clutch 60–62. In an environment where this thrust bearing action was not required, the ball 32 would not necessarily have planetary action, and the lost motion clutch assembly 11 could function in a manner that the first clutch member 31 would rotate clockwise about 80 degrees and then engage the balls 32 so that the balls rotated clockwise another 80 degrees before the third clutch member 33 was engaged and caused to rotate.

The lost motion clutch assembly 11 is shown as utilizing three balls with recesses which permit about 80 degrees of rotational movement between a ball and a particular clutch member 31 or 33. By utilizing two such clutch members 31 and 33, the 80-degree movement may be increased to about 160-degree movement, yet retaining three balls 32 for symmetry of the positioning of the balls and distribution of load. With three engagement shoulders to take the shock of starting the load 13, the outer diameter of the lost motion clutch 11 may be reduced for a given load carrying capacity.

With the construction shown, it will be seen that the first and third engagement shoulders 51, 53 of the balls 32 are disposed in the plane of rotation of the first and second engagement shoulders 41A and 42A of the first clutch member 31. Also, the second and fourth engagement shoulders 52 and 54 of the balls 32 are on the other side of the cage 37, and hence are disposed in the plane of rotation of the first and second engagement shoulders 41B and 42B of the third clutch element 33. The first and third clutch members 31 and 33 may conveniently be made from carbon steel powdered metal, which are oil-impregnated for good lubrication of the balls 32. These balls may be the type used as ball bearings, and in the present embodiment the first and third clutch members were two inches in diameter with ⅜ inch diameter balls for use with a one-fourth to one-half horsepower electric motor 12. This 160 degrees of rotation of lost motion before torque is applied to the third clutch member 33 is sufficient to allow the motor 12 to be accelerated to a condition of substantially maximum torque, so that when the lost motion is taken up, the full torque is able to be applied to the load 13.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A lost motion dog clutch assembly for connecting drive and driven members comprising, in combination:
   first, second, and third clutch members;
   means mounting said first and third clutch members coaxially on a shaft axis for limited relative rotation therebetween;
   means mounting said second clutch member between said first and third clutch members for movement in a plane normal to said axis, said second clutch member being a plurality of rolling elements;
   each said clutch member having at least a first engagement shoulder and said second member also having a second engagement shoulder, all said engagement shoulders being disposed at substantially equal radii;

said first engagement shoulders on said first and third clutch members being disposed at the termination of a plurality of respective arcuate recesses;

said first engagement shoulders of said first and second clutch members being disposed in a common plane of rotation and said second engagement shoulder of said second clutch member being disposed in the plane of rotation of said first engagement shoulder of said third clutch member, and means retaining said rolling elements in said arcuate recesses, whereby upon initial rotation of said first clutch member in a first direction said lost motion clutch assembly has a predetermined angular lost motion with said rolling elements rolling in said recesses before the third clutch member is positively rotated by abutting engagement of said first and second engagement shoulders of said second clutch member with said first shoulders on said first and third clutch members and with said rolling elements being constantly retained in said arcuate recesses.

2. A lost motion clutch assembly as set forth in claim 1, wherein said first engagement shoulders of said first and second clutch members have complementary shapes and said second engagement shoulder of said second clutch member and said first engagement shoulder of said third clutch member have complementary shapes.

3. A lost motion clutch assembly as set forth in claim 1, wherein said second clutch member is a plurality of balls.

4. A lost motion clutch assembly as set forth in claim 3, wherein said balls during said initial rotation act as planetary balls and with said three clutch members also acting as a thrust bearing.

5. A lost motion clutch assembly as set forth in claim 1, including three balls acting as said second clutch member.

6. A lost motion clutch assembly as set forth in claim 5, wherein each said first and third clutch member has three arcuate recesses with the termination on one end of each recess establishing said first engagement shoulder.

7. A lost motion clutch assembly as set fourth in claim 6, wherein said three arcuate recesses are dimensioned to achieve in the order of 160 degrees of lost motion prior to positive drive of said third clutch member by said first clutch member.

8. A lost motion clutch assembly as set forth in claim 5, including a cage disc having three apertures to closely receive said three balls.

9. A lost motion clutch assembly as set forth in claim 1, wherein said first and third clutch each have second engagement shoulders and said second clutch member has third and fourth engagement shoulders, with all being substantially radial and disposed at substantially equal radii;

said second and third engagement shoulders of said first and second clutch members respectively being disposed in a common plane of rotation and said second and fourth engagement shoulders of said third and second clutch members respectively being disposed in a common plane of rotation, whereby upon initial rotation of said first clutch member in a second direction, said lost motion clutch assembly has said predetermined angular lost motion before the third clutch member is positively rotated by abutting engagement of said second and third engagement shoulders of said first and second clutch members respectively and abutting engagement of said second and fourth engagement shoulders of said third and second clutch members respectively.

10. A lost motion clutch assembly as set forth in claim 9, wherein said drive member is a reversible rotation electric motor; means connecting said motor to drive said first clutch member in each of said first and second directions to positively drive said third clutch member in each of said first and second directions.

11. A lost motion clutch assembly as set forth in claim 10, including a friction clutch connected between said third clutch member and the driven member
and means acting through said clutch members to urge said friction clutch into frictional engagement.

12. A lost motion clutch assembly as set forth in claim 1, wherein said first and second engagement shoulders are angularly spaced for a lost motion exceeding 90 degrees prior to positive drive of said third clutch member by said first clutch member.

* * * * *

UNITED STATES PATENT AND TRADEMARK OFFICE
CERTIFICATE OF CORRECTION

PATENT NO. : 4,661,085

DATED : April 28, 1987

INVENTOR(S) : Alvin J. Carli, Sebring, Ohio

It is certified that error appears in the above-identified patent and that said Letters Patent is hereby corrected as shown below:

Column 3, line 18, after "initial"
   insert --rotation, there will be no rotation imparted to the--

Claim 9, line 8, column 6, after "clutch""
   insert --members--

Signed and Sealed this

Fifteenth Day of December, 1987

Attest:

DONALD J. QUIGG

*Attesting Officer*            *Commissioner of Patents and Trademarks*